United States Patent [19]
Pierce

[11] Patent Number: 5,383,822
[45] Date of Patent: Jan. 24, 1995

[54] MULTIPLE SPEED AUTOMATIC TRANSMISSION FOR AUTOMOTIVE VEHICLES

[75] Inventor: Stanley L. Pierce, Northville, Mich.

[73] Assignee: Ford Motor Company, Dearborn, Mich.

[21] Appl. No.: 103,373

[22] Filed: Aug. 9, 1993

[51] Int. Cl.⁶ .......................... F16H 3/56; F16H 57/10
[52] U.S. Cl. ...................................... 475/281; 475/285
[58] Field of Search ............... 475/280, 281, 284, 285, 475/318, 324

[56] References Cited
U.S. PATENT DOCUMENTS

| | | | |
|---|---|---|---|
| 4,483,215 | 11/1984 | Ishimaru et al. | 475/280 X |
| 5,106,352 | 4/1992 | Lepelletier . | |
| 5,267,916 | 12/1993 | Beim et al. | 475/285 |

FOREIGN PATENT DOCUMENTS

| | | | |
|---|---|---|---|
| 55-63041 | 5/1980 | Japan | 475/285 |
| 62-04943 | 1/1987 | Japan | 475/285 |

Primary Examiner—Charles A. Marmor
Assistant Examiner—Nathan O. Jensen
Attorney, Agent, or Firm—Frank B. McKenzie; Roger L. May

[57] ABSTRACT

An automatic transmission for an automotive vehicle includes first and second simple planetary gear units, certain of whose elements are continually interconnected and certain others are releasably connected through operation of five friction elements, hydraulically-actuated clutches and brakes. The input shaft of the transmission drives elements of the planetary gear units through an underdrive gearset and an overdrive gearset. Various speed ratios result by either underdriving or overdriving a driven element of the planetary gear unit or both underdriving one element and overdriving another element.

13 Claims, 1 Drawing Sheet

| | C1 | C2 | C3 | B1 | B2 | OWC |
|---|---|---|---|---|---|---|
| 1st | | X | | X | | |
| 2nd | | X | | | X | |
| 3rd | | X | X | | | |
| 4th | X | X | | | | |
| 5th | X | | X | | | |
| 6th | X | | | | X | |
| Rev | | | X | X | | |
| 1st | | X | | | | X |

MULTIPLE SPEED AUTOMATIC TRANSMISSION FOR AUTOMOTIVE VEHICLES

BACKGROUND OF THE INVENTION

1. Field of the Invention

The present invention relates to the clutch, brake and gear arrangement of an automatic transmission for motor vehicles, particularly to such arrangements that combine planetary gear units and layshaft gearsets.

2. Prior Art

Four-speed automatic transmissions conventionally include multiple planetary gearsets; five or six friction elements, such as hydraulically actuated clutches and brakes; a torque converter; and damped torque converter lock-up clutch. These transmissions are employed in rear-wheel drive vehicles wherein the transmission shafts and engine crankshaft are parallel to the longitudinal axis of the vehicle, and front-wheel drive vehicles wherein the transaxle and engine crankshaft are parallel to the transverse axis of the vehicle.

A current trend in the automotive industry is to provide five-speed and six-speed automatic transmissions, which conventionally require three planetary gear units and even a larger number of friction elements to control the gearing than are required in four-speed transmissions. Automatic transmissions having five or six forward speed ratios require greater size, particularly increased length, to accommodate additional planetary gear unit and friction elements. Furthermore, automatic transmissions require nonsynchronous gearshifting, which conventionally require still greater use of one-way couplings and more space within the transmission casing, particularly space in the direction of the transmission's length.

These trends toward features that enhance performance of automatic transmissions have produced need for an extremely compact transmission suitable for use in a front-wheel drive vehicle and able to fit in a space that is greatly reduced in comparison to the space required for conventional five-speed or six-speed automatic transmissions. Front-wheel drive vehicles present particularly acute problems because of the inherent space limitation associated with packaging the transmission and engine with their axes directed transversely between the drive wheels of the vehicle.

U.S. Pat. No. 5,106,352 describes a multiple speed automatic transmission having two gearsets comprising constant mesh gear wheels, a double planetary gearset, and first and second control brakes. The transmission is able to provide six forward speeds, brake neutral and reverse drive.

SUMMARY OF THE INVENTION

It is an object of this invention to provide a multiple speed automatic transmission in a highly compact form requiring a minimal number of friction element to control operation of the components of the gear units and gearsets that produce the various speed ratios. The transmission is suitable for use in nonsynchronous and synchronous modes of operation. One version of the transmission provides nonsynchronous sequential upshifts and downshifts and nonsynchronous jump shifts, in which a gear ratio change is made between nonsequential gear ratios.

A transmission according to this invention includes a combination of planetary gear units and conventional layshaft gearsets, the gear units and gearsets being arranged such that elements of the gear units are driven from the input shaft through the layshaft gearsets at two different speed ratios.

An advantage of the gear arrangement according to this invention is its compact size, particularly the reduction in overall length of the transmission and the gear box required to contain the transmission. An additional advantage is the low number of hydraulically actuated friction elements required to control the transmission gear elements.

In realizing these advantages and objectives a transmission according to the present invention includes an underdrive gearset and an overdrive gearset driveably connected to an input shaft and elements of first and second planetary gear units. Each planetary gear unit includes a sun gear, ring gear, pinions meshing with the sun gear and ring gear, and carrier rotatably supporting the pinions. The sun gear of the first gear unit, carrier of the second gear unit and one of the gearsets are mutually driveably connected. The carrier of the first gear unit, ring gear of the second gear unit and output shaft are mutually driveably connected. The control elements of the transmission hold the sun gear of the first gear unit and components connected to that sun gear against rotation on the transmission casing. A first friction clutch releasably connects the input shaft to one of the gearsets; a second friction clutch releasably connects the input shaft to the other of the gearsets. Two additional friction clutches releasably connect the ring gear of the first gear unit to one of the gearsets and the sun gear of the second gear unit to one of the gearsets.

A six-speed version of the transmission includes a second friction brake adapted to hold one of the gearsets against rotation on the transmission casing. A transmission according to the invention that produces five forward speed ratios, reverse drive and first speed ratio in a manually selected range requires only four hydraulically actuated friction clutches, a friction brake band and overrunning coupling. Six forward speed ratios, reverse drive and first speed ratio in a manually selected range are produced in a transmission according to this invention through operation of only four hydraulically actuated friction clutches, two friction brakes and one overrunning coupling.

DESCRIPTION OF THE PREFERRED EMBODIMENT

Figures 1, 2:
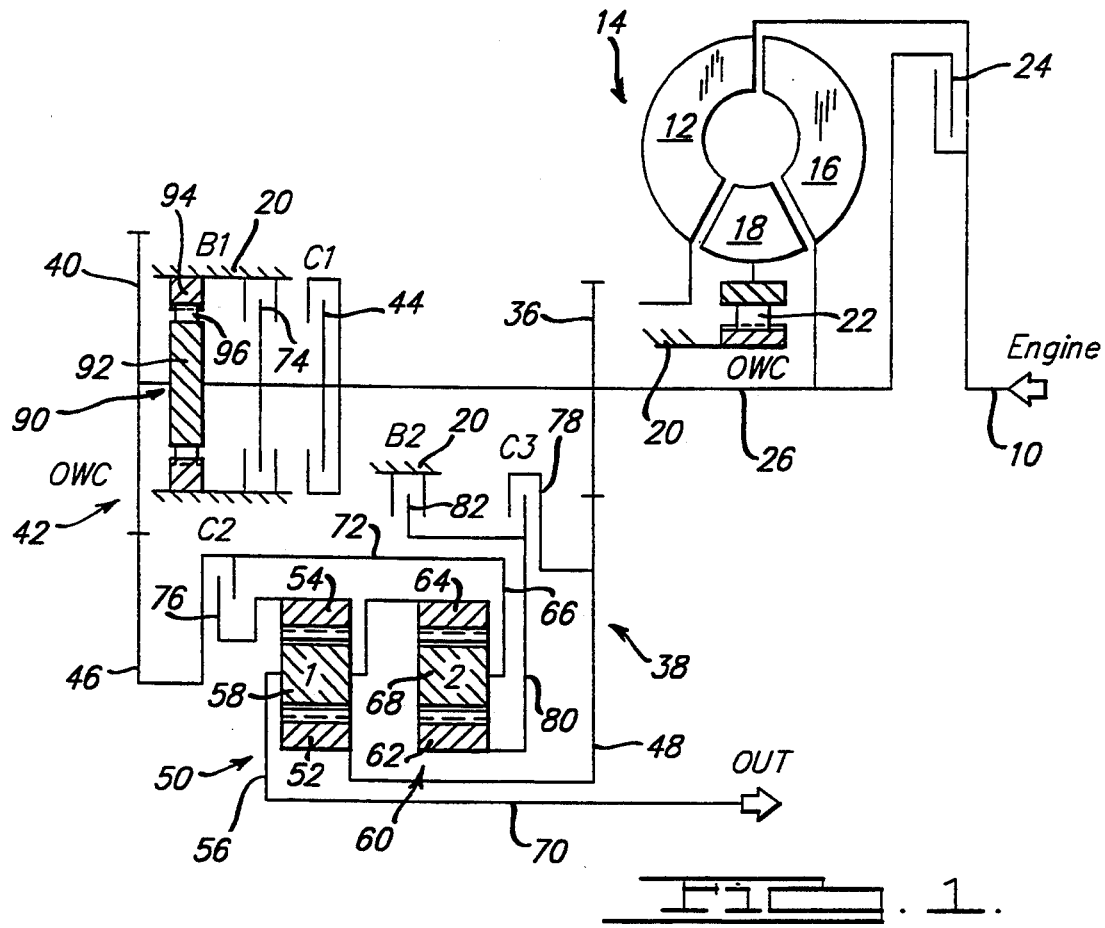
FIG. 1 is a schematic diagram showing an arrangement of gearing, couplings, clutches and brakes for a transmission acceding to the invention.
FIG. 2 is a schedule showing the engaged and disengaged state of the clutches, brake and coupling of FIG. 1 corresponding to the various gear ratios produced by the transmission.

Referring first to FIG. 1, an engine crankshaft 10 is driveably connected to a bladed impeller 12 of a hydrokinetic torque converter 14, which further includes a bladed turbine 16 and bladed stator 18. The impeller, turbine, and stator define a toroidal flow path, in which hydraulic fluid circulates, thereby producing a hydrokinetic drive connection between the impeller and turbine. The stator is mounted on a stator shaft through an overrunning coupling 22, which produces a one-way drive connection between the stator rotor and casing 20. A torque converter bypass clutch 24, an hydraulically-actuated friction element, is engaged to driveably connect crankshaft 10 to a transmission input shaft 26 and is released to connect the crankshaft and input shaft through torque converter 14.

Input shaft 26 is fixed to a pinion 36 of a first gearset 38, and it is releasably connected to a pinion 40 of a second gearset 42 by an hydraulically-actuated friction clutch 44, which is engaged and disengaged in accordance with the schedule of FIG. 2. Pinion 40, which is supported rotatably on shaft 26, is in continual meshing engagement with gear 46 of the second gearset.

A first gearset 38 includes a pinion 36, fixed to input shaft 26, and a gear 48, which is in continual meshing engagement with pinion 36.

Shaft 26 drives an hydraulic pump, which is supplied with hydraulic fluid from a sump. The pump outlet side is connected to an hydraulic control and actuation circuit, through which the torque converter 14 is continually supplied with a source of pressurized hydraulic fluid. Bypass clutch 24, one of a number of hydraulically-actuated friction elements, i.e., clutches and brakes, is engaged by the effect of pressurizing fluid carried to the bypass clutch and is disengaged by venting the bypass clutch pressure source.

A first simple planetary gear unit 50 includes sun gear 52, ring gear 54, carrier 56, and a set of planetary pinions 58, rotatably supported on carrier 56 and in continuous meshing engagement with ring gear 54 and sun gear 52.

A second simple planetary gear unit 60 includes sun gear 62, ring gear 64, carrier 66 and a set of planetary pinions 68, supported rotatably on carrier 66 and in continuous meshing engagement with sun gear 67 and ring gear 64.

Sun gear 52 is driveably connected to gear 48. Ring gear 64, carrier 56, and output shaft 70 are mutually driveably connected.

Final drive gearing, in continual meshing engagement with output shaft 70, drives the spindle of an axle differential mechanism located between axleshafts (not shown), while transmitting power to the drive wheels of the vehicle.

Input shaft 26 is releasably connected through clutch 44, a hydraulically-actuated friction clutch, to pinion 40 of the second gearset 42. Pinion 46 of the second gearset is driveably connected by member 72 to carrier 66 of the second planetary gear unit 60. Brake 74, a hydraulically-actuated friction brake, produces a releasable connection between the transmission casing 20 and pinion 40, whereby gear 46, member 72, and carrier 66 are selectively held against rotation on the transmission casing.

Clutch 76, another hydraulically-actuated friction clutch, releasably connects gear 46 and ring gear 54 of the first planetary gear unit 50.

Clutch 78, an hydraulically-actuated friction clutch, releasably connects gear 48 of the first gear set 38 and sun gear 62 of the second planetary gear unit 60, which is connected to the clutch 78 by a disc member 80. Sun gear 62 and disc 80 are held against engagement on the transmission casing 20 by engaging second brake 82.

The first gearset 38 has a gear ratio of 1.3; therefore, sun gear 52 turns slower than input shaft 26. The second gearset 42 has a gear ratio of 0,810; therefore, carrier 66 rotates faster than the input shaft.

The first forward speed ratio is produced by engaging clutch 76 and brake 74 and by disengaging the other clutches and brake. Brake 74 holds the second gear set 42, member 72, and carrier 66 fixed against rotation. Clutch 76 completes the connection of ring gear 54 to member 72; therefore, gear 54 is also held against rotation. The first gearset drives ring gear 52 slower than input shaft 26, the gearset reaction is at ring gear 54, and the output is taken at carrier 56 and output shaft 70.

The second forward speed ratio results by maintaining clutch 76, disengaging brake 74 and engaging brake 82. Brake 82 provides the gearset reaction by holding sun gear 62 fixed against rotation. Clutch 82 driveably connects carrier 66 and ring gear 54. Sun gear 52 is driven through the first gearset 38 at a speed faster than that of the input shaft and output shaft 70 is driven by carrier 56, which rotates at the same speed as ring gear 64.

A third forward speed ratio results when clutches 76 and 78 are engaged and the other friction elements are disengaged. In this condition, carrier 66 is driveably connected by clutch 76 to ring gear 54. The input shaft drives sun gear 52 through the first gearset 38 and sun gear 62 through clutch 78. Output shaft 70 is driven by the carrier 56, which is directly connected to ring gear 64.

The fourth forward speed ratio results when clutches 76 and 44 are engaged and the other friction elements are disengaged. Accordingly, sun gear 52 is underdriven in relation to the speed of input shaft 26, and carrier 66 and ring gear 54, which are interconnected through operation of clutch 76, are overdriven in relation to the speed of the input shaft. The output is taken at carrier 56 and output shaft 70.

When clutches 44 and 78 are engaged and the other friction elements disengaged, a fifth forward speed ratio is produced. Clutch 78 and sun gear 52 of the first planetary gear unit is underdriven due to its connection to gear 48 of the first gearset 38, and sun gear 62 is driven at the same speed as sun gear 52 due to the connection to gear 48 through engagement of clutch 78. Carrier 66 is overdriven in relation to the speed of input shaft 26 through operation of the second gearset 42 and the connection that exists between gear 46, member 72. The driven members of the second planetary gear unit 60, viz., sun gear 62 and carrier 66, operate to drive ring gear 64, carrier 56, and output shaft 70.

The sixth forward speed ratio results by engaging brake 82 and clutch 44 and disengaging the other friction elements. Sun gear 62 is held against rotation on the transmission casing 20 through disc 80 and the drivable connection made by engagement of brake 82 to the transmission casing. The driving member of the second planetary gear unit 60, carrier 66, is overdriven in relation to the speed of input shaft 26 through operation of the second gear unit 42. The driven element, ring gear 64, drives the output, carrier 56, and output shaft 70.

To produce reverse drive, clutch 78 and brake 74 are engaged and the other friction elements are disengaged. Due to the drive connection produced by clutch 78, sun gear 62 is underdriven from input shaft 26 through operation of first gearset 38. Carrier 66 is fixed on housing 20 against rotation due to the engagement of brake 74, and the output is taken at ring gear 64, carrier 56, and output shaft 70.

Nonsynchronous 1-2 and 2-1 gearshifts are produced by installing an overrunning coupling 90 between the transmission housing and input shaft 26. Coupling 90, which produces a one-way drive connection between the housing and shaft 26, includes a hub 92 fixed to the shaft, a ring 94 fixed to the housing, rollers 96 located between the ring and hub and mutually spaced about the coupling axis, the rollers engaging a cam surface on the ring or hub to connect driveably the ring and hub in one direction of rotation, and disengaging the cam surface to disconnect the ring and hub in the opposite direction of rotation. FIG. 1 shows the coupling located between brake 74 and pinion 40.

The first gear ratio can be produced also through operation of coupling 90 by engaging clutch 76 and disengaging the other friction elements, including brake 74. Gearset 38 drives sun gear 52 from shaft 26. The gearset reaction is provided at ring gear 54, which is held fixed against rotation on the housing due to the one-way drive connection between the shaft 26 and the housing produced by coupling 90. The output is taken at carrier 56 and shaft 70.

To produce the other forward and reverse gear ratios, either coupling 90 overruns or (as in the case of reverse drive) brake 74 is engaged to connect shaft 26 to the housing, rather than producing that connection through coupling 90.

This arrangement produces a compact transaxle for use in front wheel drive vehicles having a combination of lay shaft gearsets and planetary gear units. The transaxle produces six forward speed ratios and reverse drive through operation of only five friction elements.

I claim:

1. A multiple speed ratio automatic transmission housed in a casing, comprising:
    an input shaft (26);
    an output shaft (70);
    a first gearset (38) driveably connected to the input shaft;
    a second gearset (42);
    first (50) and second (60) gear units, each gear unit having a sun gear, ring gear, planet pinions meshing with the sun gear and ring gear, and carrier rotatably supporting the planet pinions, the carrier (56) of the first gear unit, ring gear (64) of the second gear unit, and output shaft mutually driveably connected, the carrier (66) of the second gear unit driveably connected to the second gearset, the sun gear (52) of the first gear unit driveably connected to the first gearset;
    first brake means for releasably holding the second gearset and carrier of the second gear unit against rotation;
    first clutch means (44) for releasably connecting the input shaft and second gearset;
    second clutch means (76) for releasably connecting the second gearset and ring gear of the first gear unit;
    third clutch means (78) for releasably connecting the sun gear of the second gear unit and first gearset; and
    second brake means (82) for releasably holding the sun gear of the second gear unit against rotation.

2. The transmission of claim 1 further comprising torque converter means (14) driveably connected to the input shaft and adapted for connection to a power source for producing an hydrokinetic connection between the input shaft and power source.

3. The transmission of claim 1 wherein the first gearset includes:
    a first pinion rotatably supported on the input shaft; and
    a first gear in meshing engagement with said first pinion, driveably connected to the sun gear of the first gear unit.

4. The transmission of claim 1 wherein the second gearset includes:
    a second pinion rotatably supported on the input shaft; and
    a second gear in meshing engagement with said second pinion, driveably connected to the carrier of the second gear unit.

5. The transmission of claim 4 wherein:
    the first gearset underdrives the sun gear of the first gear unit in relation to the speed of the input shaft; and
    the second gearset overdrives the first gear in relation to the speed of the input shaft.

6. The transmission of claim 1 wherein the first brake means comprises:
    coupling means (90) for producing a one-way drive connection of the second gearset and a nonrotatable surface (20); and
    friction brake means (74) arranged in series with the coupling means, for releasably holding the second gearset against rotation.

7. A multiple speed ratio automatic transmission, comprising:
    an input shaft;
    an output shaft;
    a first and second gearset means (38,42), each gearset means having a first element driveably connected to the input shaft and a second element driven at a different speed than that of the input shaft;
    first and second gear units, each gear unit having a sun gear, ring gear, planet pinions meshing with the sun gear and ring gear, and carrier rotatably supporting the planet pinions, the ring gear of the second gear unit, carrier of the first gear unit, and output shaft mutually driveably connected, the carrier of the second gear unit and second gearset mutually driveably connected, the sun gear of the first gear unit driveably connected to the first gearset;
    first brake means for releasably holding a first element of the second gear unit against rotation;
    first clutch means (44) for releasably connecting mutually the input shaft and a first element of the first gear unit through the second gearset;
    second clutch means (76) for releasably connecting said first element of the second gearset and one of said first and second gear units;
    third clutch means (78) for releasably connecting a second element of the first gearset and one of said first and second gear unit; and
    second brake means (82) for releasably connecting a second element of the second gear unit and one of said first and second gearset means.

8. The transmission of claim 7 wherein the first gearset means includes:
    a first pinion driveably connected to the input shaft; and
    a first gear in meshing engagement with said first pinion, driveably connected to the sun gear of the first gear unit.

9. The transmission of claim 7 wherein the second gearset means includes:
    a second pinion releasably driveably connected to the input shaft; and a second gear in meshing engagement with said second pinion, driveably connected to the carrier of the second gear unit.

10. The transmission of claim 7 wherein:
the first gearset means underdrives the sun gear of the first gear unit in relation to the speed of the input shaft; and
the second gearset means overdrives the carrier of the second gear unit means in relation to the speed of the input shaft.

11. The transmission of claim 7 wherein the first brake means comprises:
coupling means (90) for producing a one-way drive connection of the second gearset and a nonrotatable surface (20); and
friction brake means (74) arranged in series with the coupling means, for releasably holding the second gearset against rotation.

12. A multiple speed ratio automatic transmission, comprising:
an input shaft;
an output shaft;
a first gearset including a first pinion connected to the input shaft and a first gear in meshing engagement with said first pinion, driveably connected to the sun gear of the first gear unit;
a second gearset including a second pinion releasably connected to the input shaft and a second gear in meshing engagement with said second pinion, driveably connected to the first brake means, first clutch means, carrier of the second gear unit and sun gear of the first gear unit;

first and second gear units, each gear unit having a sun gear, ring gear, planet pinions meshing with the sun gear and ring gear, and carrier rotatably supporting the planet pinions, the carrier of the first gear unit, ring gear of the second gear unit, and output shaft mutually driveably connected, the carrier (66) of the second gear unit driveably connected to the second gearset, the sun gear of the first gear unit driveably connected to the first gearset;
second coupling means for producing a one-way drive connection of the sun gear of the first gear unit, carrier of the second gear unit, and first gearset to a nonrotatable surface; and
first brake means for releasably holding the second gearset and carrier of the second gear unit against rotation;
first clutch means (44) for releasably connecting the input shaft and first gearset;
second clutch means (76) for releasably connecting the second gearset and ring gear of the first gear unit;
third clutch means (78) for releasably connecting the sun gear of the second gear unit and first gearset; and
second brake means (82) for releasably holding the sun gear of the second gear unit against rotation.

13. The transmission of claim 12 further comprising torque converter means (14) driveably connected to the input shaft and adapted for connection to a power source for producing an hydrokinetic connection between the input shaft and power source.

* * * * *